United States Patent [19]

Rockwell

[11] Patent Number: 4,827,086
[45] Date of Patent: May 2, 1989

[54] DIGITIZER CURSOR COIL FOR REDUCING EDGE EFFECT

[75] Inventor: Lynn H. Rockwell, Mesa, Ariz.

[73] Assignee: CalComp Inc., Anaheim, Calif.

[21] Appl. No.: 116,034

[22] Filed: Nov. 3, 1987

[51] Int. Cl.$^4$ .............................................. G08C 21/00
[52] U.S. Cl. ..................................... 178/19; 340/710
[58] Field of Search .......................... 178/18, 19, 20;
324/207, 208; 340/709, 710

[56] References Cited

U.S. PATENT DOCUMENTS

| | | | |
|---|---|---|---|
| 2,776,416 | 1/1957 | Harris | 340/11 |
| 2,776,417 | 1/1957 | Harris | 340/11 |
| 2,905,915 | 9/1959 | Harris | 336/181 |
| 3,816,776 | 6/1974 | Chari | 310/13 |
| 4,397,033 | 9/1983 | Bechet | 382/3 |
| 4,471,162 | 9/1984 | Aono et al. | 178/19 |
| 4,740,660 | 4/1988 | Kimura | 178/19 |

Primary Examiner—Stafford D. Schreyer
Attorney, Agent, or Firm—Nutter, McClennen & Fish

[57] ABSTRACT

A digitizer cursor coil for use as part of a digitizer is disclosed. The cursor coil includes a primary winding and a secondary winding concentric with the primary winding and having a larger diameter than same. The windings are connected together in series such than when they are energized, current flow in the primary coil is in a direction opposite to the direction of the current flow in the secondary coil. The digitizer cursor includes a lens assembly comprising a bottom core and a top core both of which are formed from a disk shaped transparent material. The primary winding is wrapped into a groove formed in the bottom core, the secondary winding is wrapped into a groove formed in the top core. Cross hairs and a cross hair center point are formed in the bottom core. The top core is movable relative to the top core so that when the cursor coil is energized the center point of the magnetic field formed thereby can be aligned with the cross hair center point.

20 Claims, 4 Drawing Sheets

DIGITIZER CURSOR COIL FOR REDUCING EDGE EFFECT

FIELD OF THE INVENTION

This invention relates to digitizer cursors and in particular to a digitizer cursor coil with an integral secondary coil.

BACKGROUND OF THE INVENTION

A digitizer cursor is part of a digitizing device that, in conjunction with a digitizing tablet, is used to generate digital signals representative of the location of the cursor on the tablet. Digitizing devices are often used with data processing equipment to allow the operator to input information that can best be expressed in multi-dimensional analog terms. For instance, a digitizing device can be used in conjunction with computer aided design equipment to enable the user to input information regarding the location of features of the item being designed. Digitizing devices can also be used as part of a communications system to enable the users to transmit and receive digital representations of analog information.

A typical digitizing device includes a digitizing tablet, a digitizing cursor, and a digitizing circuit. The digitizing tablet is provided with two sets of parallel grid conductors that are electrically connected to the digitizing circuit. The individual grid conductors are spaced apart from each other and the sets are arranged perpendicular to each other so as to form an x-y grid of rectangular sections separated by the conductors.

The digitizing cursor includes a relatively flat lens assembly typically formed from two sections of planar, spaced apart transparent material. Cross hairs, arranged to form a cross hair center point, are inscribed on one of the sections of transparent material, usually the section placed closest to the digitizing tablet. A digitizing cursor coil, typically wire wound on a bobbin, is housed inside the viewing assembly between the two sections of transparent material. The digitizing coil is connected to the digitizing circuit and is energized thereby. The digitizing coil is positioned inside the viewing assembly so that when a current is supplied to it, the center point of the magnetic field formed around the coil is aligned with the center point of the cross hairs.

A digitizer typically is provided with an overlay above the digitizing tablet that is representative of the area containing the coordinates that the user desires to digitize. The user identifies, or digitizes, specific coordinates on the overlay by first positioning the cursor so the lens cross hairs are aligned over the desired location. The cursor coil is then energized, a current is applied to it, so the resulting cursor magnetic field is generated. Sensors in the digitizing circuit associated with the individual grid conductors in the digitizing tablet provide an indication of the center point of the cursor coil magnetic field on the digitizing tablet. The signals produced by the sensors are digitized by additional components within the digitizing circuit to provide the digital signals representative of the cross hair center point's location on the digitizing tablet.

Advances in electronics technology have made it possible to interpolate the position of the lens cross hairs/cursor coil between parallel grid conductors. This has made it possible to provide digitizing devices that generate an output of the location of the cursor on the digitizing tablet with a very high degree of accuracy.

An important consideration in the design of digitizing devices is the elimination of edge effects produced by the cursor coil when it is energized. Edge effects are caused by fringe magnetic fields that invariably form within the area spanning a certain radial distance away from the cursor coil.

Edge effects are undesirable because the fringe magnetic fields cause some of the sensors associated with the grid conductors to generate extraneous signals that interfere with the processing of the signals that represent the true location of the cursor. Consequently, an important consideration in the manufacture of digitizers is providing a means to eliminate the unwanted fringe magnetic fields.

Currently, edge effects around a cursor coil are reduced by providing a metal shield around the coil. This metal shield typically takes the form of a metal ring which surrounds the cursor coil. Additional shielding is provided by mounting the lens assembly, including the cursor coil, on a metal base, typically made of aluminum. The metal ring and metal base provide sufficient shielding so that the edge effects and attendant problems are eliminated.

However, there are several disadvantages associated with using metal shielding to eliminate edge effects. Assembling the cursor so the bobbin and wire forming the cursor coil are secured in the metal ring is a complicated and costly task. Securing the cursor coil is difficult in part because the coil must be positioned so that, when it is energized, the center point of its magnetic field is aligned with the lens cross hair center point. Providing an assembly which permits the bobbin forming the cursor coil to be so aligned and positioned is expensive.

Furthermore, the metal shield in the cursor adds to its bulk and weight making the cursor more cumbersome to manipulate during use of the digitizer.

SUMMARY OF THE INVENTION

Accordingly, it is an object of this invention to provide a digitizer cursor coil that includes improved means for eliminating edge effects caused by unwanted fringe magnetic fields.

It is. another object of this invention to provide a digitizer coil that is relatively easy to align relative to the associated lens assembly cross hairs.

It is still a further object of this invention to provide a digitizer cursor coil that can be formed out of relatively inexpensive components and can be assembled into a cursor with a minimal effort and cost.

These, and other objects of this invention, are provided with a digitizing cursor coil that consists of a primary winding and a secondary winding that are substantially concentric. The secondary winding has a diameter greater than that of the primary winding. The windings are connected together in series such that when the cursor coil is energized, the orientation of the magnetic field formed around the secondary winding is opposite the orientation of the magnetic field formed around the primary winding.

In the preferred embodiment of the invention, the primary and secondary coils forming the cursor coil are integral parts of the lens assembly. The lens assembly consists of top and bottom cores each formed of disk-shaped transparent material. The top core has a larger radius than the bottom core. The bottom core may be manufactured with cross hairs embedded or molded therein. An annular groove is formed in the outside of the bottom core, and a separate annular groove is formed in the outside of the top core. Wire forming the primary winding is wound into the bottom core groove. Wire forming the secondary winding is wound into the top core groove. The bottom core and the top core are both assembled inside a cursor housing.

When the cursor coil of this invention is energized, opposed magnetic fields form around the primary and secondary windings. The fringe magnetic fields that form around the outside of the primary winding are canceled by the opposite fringe magnetic fields formed around the secondary winding. Canceling the fringe magnetic fields around the primary cursor coil eliminates edge effects, and the subsequent need to provide metal shielding to limit it.

Moreover, the digitizer cursor coil of this invention can be assembled so the coil is an integral part of the lens assembly. This eliminates the need of providing a coil bobbin and a separate means for mounting and aligning same.

The digitizer cursor coil of this invention is assembled so the bottom core carrying the primary winding is firmly attached to the cursor housing, and the top core carrying the secondary winding is adjustably secured to the housing so it has a limited degree of movement over the bottom core. This makes aligning the cursor coil so the center point of the magnetic field is centered over the cross hair center point a relatively simple task. The top core coil is simply moved into place until the center point of the magnetic field is positioned over the cross hair center point, and then secured to the housing.

The parts needed to form the cursor coil lens assembly are inexpensive to fabricate. By using this digitizer cursor coil the need to provide costly metal shielding and assemble the digitizer by using complicated and expensive processes is obviated.

Moreover, use of this digitizer cursor coil makes it possible to provide a digitizer cursor with a plastic package with desirable ergonomic qualities which facilitate manipulation of the cursor in the digitizer.

BRIEF DESCRIPTION OF THE DRAWINGS

FIG. 4A is an enlargement of a portion of FIG. 4.

DETAILED DESCRIPTION OF THE INVENTION

Figure 1:
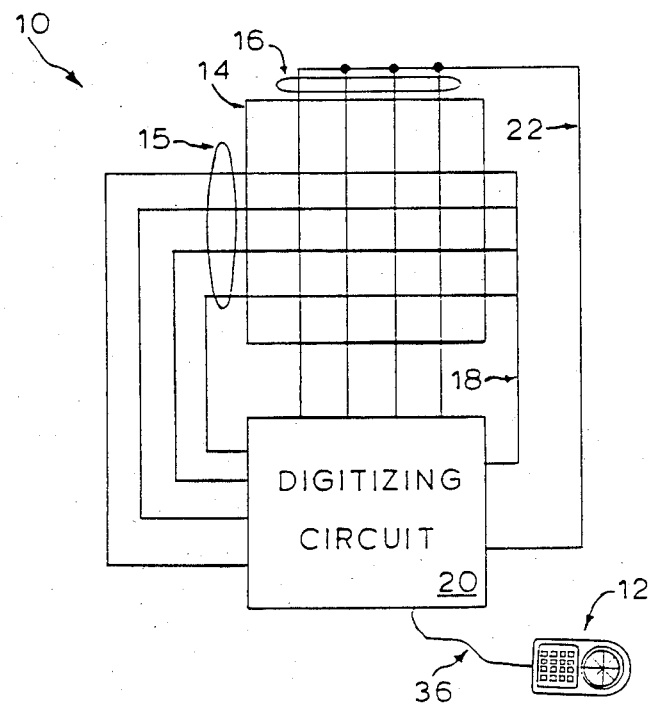
FIG. 1 is a block diagram of a digitizer of the type that would employ a digitizing cursor with a cursor coil of the present invention.

FIG. 1 depicts a typical digitizer 10 provided with a digitizing cursor 12. The digitizer 10 has a digitizing tablet 14 that functions as the "writing surface" on which the digitizing cursor 12 is used. On the underside surface of the digitizing tablet 14 are first and second sets of parallel grid conductors, 15 and 16 respectively, that run perpendicular to each other. All of the conductors of the first grid conductor set 15 are connected at one end to a common conductor 18 which connects to a digitizing circuit 20. The other ends of the grid conductors 15 are connected individually to the digitizing circuit 20, which includes a switch for each of the conductors 15 to select the conductor whose signals will be sensed. Similarly, the conductors of the second grid conductor set 16 are connected by a common conductor 22 to the digitizing circuit 20 and they are connected individually at the other ends to the digitizing circuit 20.

The digitizer cursor 12, also connected to the digitizing circuit 20, includes a cursor coil which will be described in detail hereinafter. When the digitizing circuit is actuated, it energizes the cursor coil so as to cause it to generate a magnetic field. When the digitizing cursor 12 is over the digitizing tablet 14, the magnetic field generated by the cursor coil induces electrical signals in the first and second sets of grid conductors 15 and 16. Sensors in the digitizing circuit 20 are responsive to the signals induced in the grid conductors 15 and 16.

When the cursor coil is energized, the digitizing circuit 20 senses the signals on the grid conductors 15 and 16 in succession to determine which grid conductors carry signals of greatest amplitude. The signals of greatest amplitude are generated in the grid conductors 15 and 16 at the perimeter of the cursor coil. The digitizing circuit 20 determines the ratios of the strongest signals in each set of grid conductors 15 and 16, and from this determines the location of the digitizing cursor 12 on the digitizing tablet 14. The digitizing circuit 20 then generates digital signals, over output lines not shown, representative of the location of the cursor 12 on the digitizing tablet 14.

Figure 2:
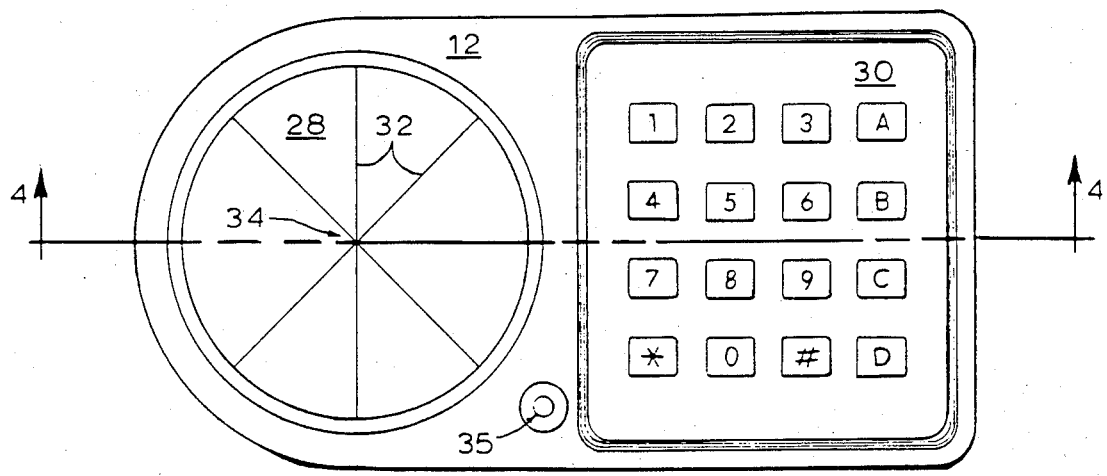
FIG. 2 is a front perspective view of a digitizing cursor that employs the cursor coil of the present invention.

Referring to FIG. 2, the digitizing cursor 12 is shown in greater detail to include a cursor housing 26 that contains a lens assembly 28 and a small keyboard 30. The lens assembly 28, mounted in an opening 29 formed in the housing 26, is formed of generally circular transparent material, such as plastic or glass, and has a set of cross hairs 32 embedded or otherwise formed therein that intersect to form a cross hair center point 34. The cross hairs 32 and associated cross hair center point 34 are provided so that the user can precisely position the digitizer cursor 12 over the digitizing tablet 14 location that he/she wants digitized. The keyboard 30 is provided to allow the user to control the operation of the digitizer 10, e.g., indicate when the cursor 12 is positioned over a location on the digitizing tablet that should be digitized. The keyboard also allows the user to enter collateral information, such as identification numbers, at the tablet locations that are digitized.

A cursor printer circuit board 31 (FIG. 3) mounted on a base 35 integral with the housing 26 carries the circuit elements necessary to operate the digitizer cursor 12. One or more indicator lights 35 (only one is shown) may be provided with the digitizer cursor 12 to provide information regarding the status of the digitizer's operation. A cable 36 (FIG. 1) connected between the digitizing cursor 12 and the digitizing circuit 20 includes a set of conductors which carry electrical signals therebetween.

Figure 4:
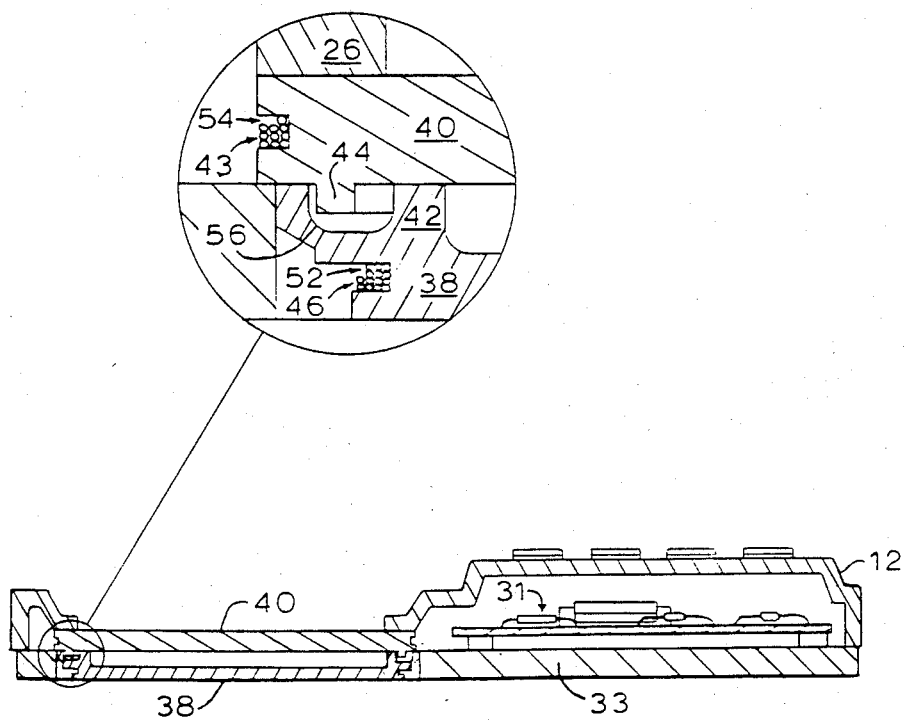
FIG. 4 is a cross section view of the digitizer cursor coil of this invention taken along line 4—4 of FIG. 2.
Figure 3:
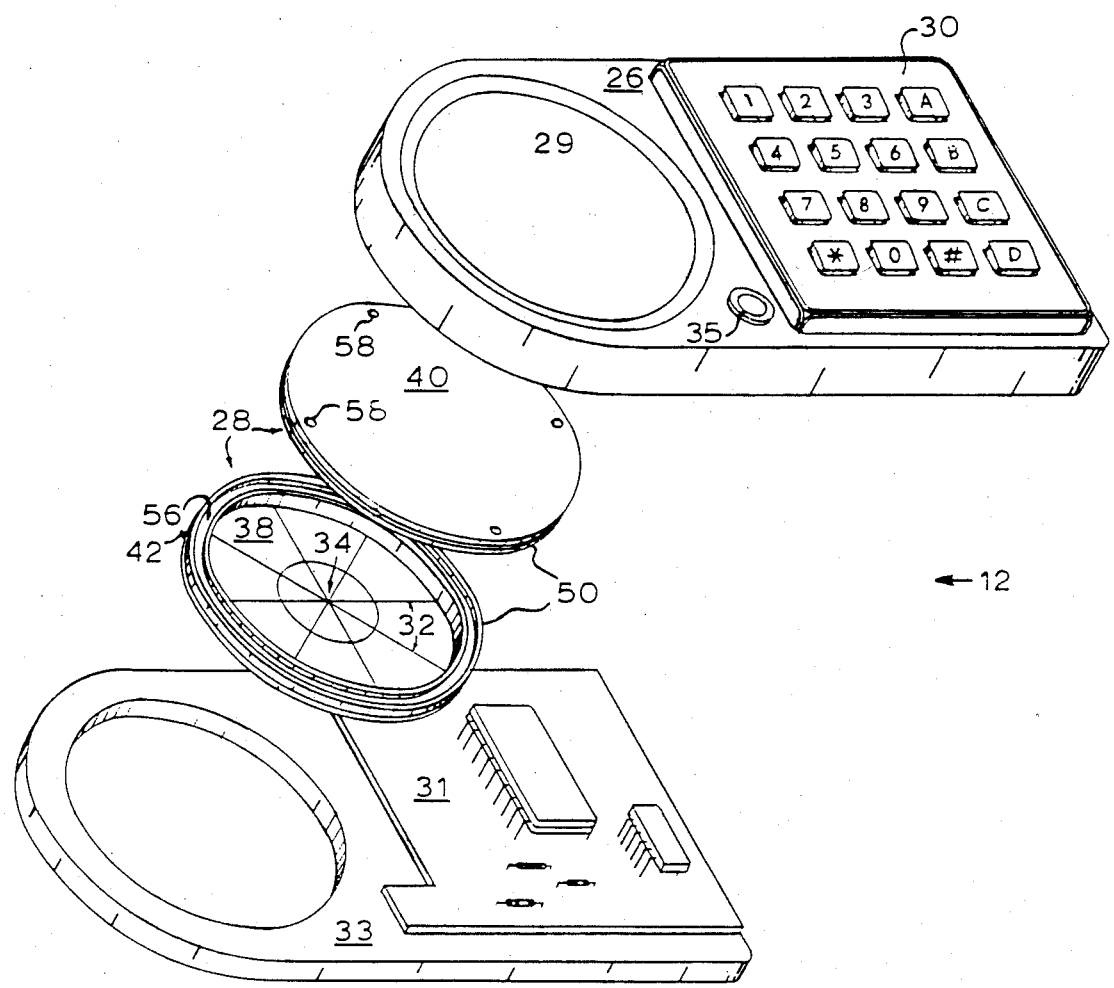
FIG. 3 is a perspective exploded view of the digitizing cursor, of FIG. 2.

As best seen by reference to FIGS. 3 and 4, the lens assembly 28 includes a bottom core 38 and a top core 40, both of which are formed of transparent material and are generally disk shaped and generally concentric. The bottom core 38 is the portion of the lens assembly 28 that is placed closest to the digitizing tablet 14. The cross hairs 32 are formed in the bottom core 38 so that the cross hair center point 34 is at the center thereof. The top core 40 has a slightly larger diameter than the bottom core 38. Integral with the bottom core 38 is an upwardly extending, outwardly stepped bottom core flange 42. Integral with the top core 40 is a downwardly extending top core flange 44 that is located slightly inward of the outer perimeter of the top core. An annular bottom groove 46 is formed around the outer surface of the bottom core 38. An annular top groove 48 is formed around the outer surface of the top core 40. The top groove 48 has a radius larger than the radius of the bottom groove 46, i.e., in one embodiment of the invention the top groove 48 has a diameter of 2.33 inches and the bottom groove 46 has a diameter of 2.20 inches.

The lens assembly 28 also includes a digitizing cursor coil 50. The coil 50 includes a primary winding 52 wrapped into the bottom groove 46 that functions as a first coil. A secondary winding is wrapped into the top groove 48 in the top core 40 functions as a second coil. The windings 52 and 54 are both formed of insulated wire of the type well known in the field of inductive coils. In one embodiment of the invention there are 14 turns of wire in the primary winding 52 and 10 turns of wire in the secondary winding.

The windings 52 and 54 are connected together in series so the current flow in the primary winding 52 is in a direction opposite to the current flow in the secondary winding 54. In one embodiment, the windings 52 and 54 are connected together by conductors on the cursor printed circuit board 31 (not illustrated). The windings 52 and 54 are wrapped so that when the digitizer cursor coil 50 is energized, the magnetic flux generated by the primary winding 52 is greater than the magnetic flux generated by the secondary winding 54.

FIG. 4 best depicts how the lens assembly 28 and cursor coil 50 are attached to the digitizer cursor 12. The bottom core 38, with the primary winding 52 wrapped into the bottom groove 46, is fixed to the cursor housing base 33. The top core, with the secondary winding 54 wrapped into the top groove 48, is placed over the bottom core 38. Formed in the top of the bottom core flange 42 is an annular mounting slot 56 that, in conjunction with the top core flange 44, functions as a tab-in-slot alignment assembly so that the bottom core 38 and top core 40 can be coupled together. The width of the bottom core flange mounting slot 56 is slightly greater than the thickness of the top groove flange 48 so that when the top core 40 is coupled over the bottom core 38, the top core 40 has a limited range of movement thereover. Openings 58 are formed in the top core 40 to introduce an adhesive or a solvent into the bottom core mounting slot 56 so the cores 38 and 40 can be secured together.

Figure 5:
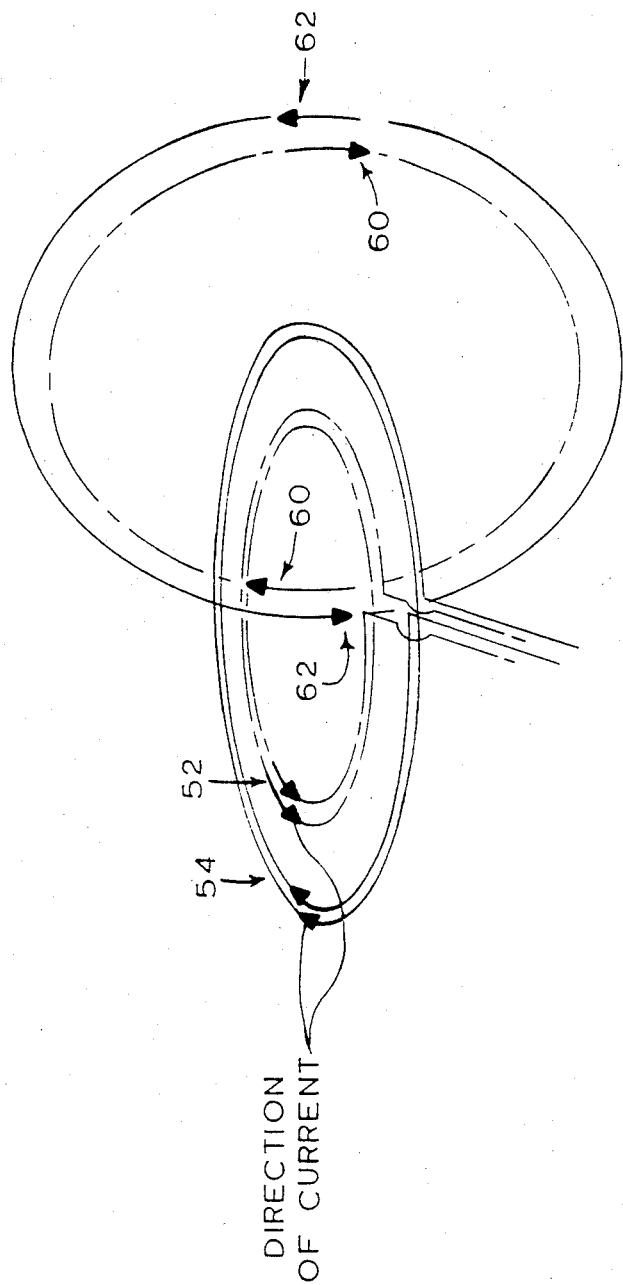
FIG. 5 is a cross section view of the primary and secondary winding forming the cursor coil of this invention and the magnetic fields that form around them when they are energized.

The digitizer cursor coil 50 of this invention is energized whenever the user positions the lens cross hair center point 34 over a location on the digitizing tablet 14 the coordinates of which he/she wants digitized, and presses the appropriate button on the keyboard. Current is thus supplied to the cursor coil 50 which causes magnetic fields to form around the primary and secondary windings 52 and 54. As depicted by FIG. 5, since the current flow in the primary winding 52, shown in phantom, and the current flow in the secondary winding 54, shown in solid, forming the cursor coil 50 are in opposite directions, the orientation of the magnetic fields that they form are opposite to each other. In the illustrated embodiment, the field around the primary coil 52, illustrated in phantom and represented by arrows 60, has a clockwise oriented flux, and the fields around the secondary coil 54, illustrated in solid and represented by arrows 62, has a counter-clockwise oriented flux. The center point of the magnetic field formed by the primary winding 52 is sensed and processed by the digitizing tablet 14-digitizing circuitry 20 components to generate a digital signal representative of the cursor's 12 location as described.

The magnetic field formed around the secondary coil 54 cancels the field formed by the primary coil 52 beyond its useful range. This eliminates edge effects caused by the fringe magnetic fields around the primary coil 52 that would otherwise generate signals that interfere with the digitizing of the cursor's 12 true location. Since edge effects around the digitizing cursor coil 50 are eliminated, there is no need to provide the cursor with metal shielding to eliminate them. Thus, the digitizer 12, including the housing 26, can be fabricated out of material such as plastic which is economical to manufacture and assemble into the completed digitizer cursor 12.

Moreover, the elimination of the cursor metal shielding improves the overall ergonomics of the digitizer cursor 12. This is in part because, without the metal shielding, the weight of the cursor 12 is reduced. Also, since the metal shielding is eliminated, the cursor can be assembled in a housing designed with the user's comfort in mind. In other words, since the housing does not have to be provided with a metal ring, it can be formed in almost any shape desirable for the user.

The digitizer cursor coil 50 is relatively easy to align so the center point of the cursor coil magnetic field is in registration with the lens assembly cross hair center point 34. This is because the magnetic field formed by the secondary winding 54 combines with the magnetic field formed by the primary winding 52 to shift the center point of the latter. The lens assembly top core 40 carrying the secondary winding 54 is thus moved while the cursor coil 50 is energized until the center point of the primary winding 52 magnetic field is aligned over the cross hair center point 34. After the magnetic field formed by the primary winding 52 and the cross hair center point 34 are so aligned, an adhesive or a solvent is introduced into the bottom core mounting slot 56 through the top core openings 58 so as to secure or cold weld the cores 38 and 40 together. Hence, the cursor coil 50 can be readily aligned with the lens assembly 28 with a minimal amount of effort and associated cost.

The lens assembly 28 including the cursor coil 50 therewith can be assembled out of components that are readily available and economic to fabricate. Assembling the digitizer cursor 12 with the lens assembly 28 and a cursor coil 50 can be performed by a number of inexpensive manufacturing steps.

This description is for the purposes of illustration only. Alternative embodiments of this invention are possible without departing from the scope of the claims. For instance, in some embodiments, it may be desirable to wrap the cursor coil so that it is integral with the lens assemble. In these embodiments, it may be desirable to wrap the wire forming the primary and secondary cursor coil windings around two concentric bobbins, or a single bobbin with a stepped outer surface. Other markings aside from cross hairs forming a cross hai center point can be used as reference markings and reference points on the lens assembly.

Furthermore, the description of the diameter of the grooves where the windings are formed, and the number of turns of wire forming the are merely offered for purposes of example and are not meant to be limiting. Also, alternative means to position the top core so the coil magnetic field is aligned with the lens assembly may be provided. For example, in some embodiments, it may be desirable to provide set screws to position and/or secure the top core. In other embodiments, means to position the bottom core or other member carrying the primary winding may be provided, or means to position both the primary winding and the secondary winding may be provided.

Therefore, it is the object of the appended claims to cover all such variations and modifications that come within the true scope and spirit of the invention.

I claim:

1. A digitizer cursor coil for use in a digitizer cursor used as part of a digitizer assembly, comprising:
   (A) a primary winding formed of conductor wrapped into a first coil of a selected diameter; and
   (B) a secondary winding formed of a conductor wrapped into a second coil, said second coil being substantially concentric with said first coil and having a diameter greater than said first coil, said conductors forming said primary and secondary windings being connected together in series such that when said conductors are energized, current flow in said primary winding is a first direction and in said secondary winding in a second direction opposite said first direction.

2. The digitizing cursor coil of claim 1 wherein at least one of said windings can be adjustably positioned relative to the other of said windings.

3. The digitizer cursor coil of claim 1 wherein said cursor coil is assembled with a lens assembly that is part of the digitizer assembly, said lens assembly formed of transparent material having at least one reference marking thereon, said reference marking defining at least one reference point.

4. The digitizer cursor coil of claim 1 wherein said cursor coil is assembled with a lens assembly that is part of the digitizer assembly, said lens assembly formed of transparent material have a set of cross hairs thereon, said cross hairs arranged to define a cross hair center point.

5. The digitizer cursor coil of claim 4 wherein at least one of said windings forming the digitizer cursor coil can be selectively positioned relative to said lens assembly so that when said digitizer cursor coil is energized, the cursor coil generates a magnetic field having a center point aligned with said cross hair center point.

6. A digitizer cursor for use as part of a digitizing device, comprising:
   A. a bottom core composed of transparent material formed in the shape of a disk, having a selected first diameter, said bottom core having an annular outer surface therearound,
   B. a top core composed of transparent material formed in the shape of disk having a second diameter greater than the bottom core first diameter; and
   C. a cursor coil including:
      (i) a primary winding formed of a conductor wrapped around said bottom core outer surface,
      (ii) a secondary winding formed of a conductor wrapped around said top core outer surface; and
      (iii) said conductors forming said primary and secondary windings connected together in series so that when said conductors are energized, current flows in said primary winding in a first direction, and in said secondary winding in a second direction opposite said first direction.

7. The digitizer cursor of claim 6 wherein
   A. a bottom groove is formed in the bottom core around the outer surface thereof;
   B. a top groove is formed in the top core around the outer surface thereof;
   C. the conductor forming said primary winding is wrapped in said bottom core annular groove; and
   D. the conductor forming said secondary winding is wrapped in said top core annular groove.

8. The digitizer cursor coil of claim 6 wherein at least one of said cores can be selectively positioned relative to the other of said cores.

9. The digitizer cursor coil of claim 6 wherein at least one of said cores has formed therewith at least one reference marking thereon, said reference marking defining at least one reference point.

10. The digitizer cursor coil of claim 6 wherein at least one of said cores has a set of cross hairs formed therewith, said cross hairs arranged to form a cross hair center point.

11. The digitizer cursor coil of claim 10 further including at least one of said cores being selectively positioned so that when said conductors forming said primary and secondary windings are energized, the cursor coil generates a magnetic field formed having a center point aligned with said cross hair center point.

12. The digitizer cursor of claim 6 further including:
   A. said top core including a downward extending annular tab having a selected thickness; and
   B. said bottom core including an upward extending annular flange having a top surface, said flange forming an annular groove having a selected width in the top surface thereof, said groove having a diameter substantially equal to the diameter of said top core annular tab; the width of said groove being wider than the thickness of said top core tab, so that when said top core is positioned over said bottom core such that said top core tab is positioned in said bottom core flange groove, said top core is allowed a limited degree of movement relative to said bottom core.

13. The digitizer cursor of claim 12 further including:
   A. a bottom groove is formed in a bottom core around the outer surface thereof;
   B. a top groove is formed in the top core around the outer surface thereof;
   C. the conductor forming said primary winding is wrapped in said bottom core annular groove; and
   D. the conductor forming said secondary winding is wrapped in said top core annular groove.

14. The digitizer cursor coil of claim 12 wherein at least one of said cores has formed therewith at least one reference marking thereon, said reference marking defining at least one reference point.

15. The digitizer cursor coil of claim 12 wherein at least one of said cores has a set of cross hairs formed therewith, said cross hairs arranged to form a cross hair center point.

16. A digitizer cursor coil for use in a digitizer cursor used as part of a digitizer assembly, comprising:
   (A) a primary winding formed of conductor wrapped into a first coil of a selected diameter; and
   (B) a secondary winding formed of a conductor wrapped into a second coil, said second coil being substantially concentric with said first coil and having a diameter different than said selected diameter of said first coil, said conductors forming said primary and secondary windings being connected together in series such that when said conductors are energized, current flow in said primary winding is a first direction and in said secondary winding in a second direction opposite said first direction.

17. The digitizing cursor coil of claim 16 wherein at least one of said windings can be adjustably positioned relative to the other of said windings.

18. The digitizer cursor coil of claim 16 wherein said cursor coil is assembled with a lens assembly that is part of the digitizer assembly, said lens assembly formed of transparent material having at least one reference marking thereon, said reference marking defining at least one reference point.

19. The digitizer cursor coil of claim 16 wherein said cursor coil is assembled with a lens assembly that is part of the digitizer assembly, said lens assembly formed of transparent material have a set of cross hairs thereon, said cross hairs arranged to define a cross hair center point.

20. The digitizer cursor coil of claim 19 wherein at least one of said windings forming the digitizer cursor coil can be selectively positioned relative to said lens assembly so that when said digitizer cursor coil is energized, the cursor coil generates a magnetic field having a center point aligned with said cross hair center point.

* * * * *